June 20, 1939.  E. R. JACOBY  2,163,040
INDUCTION SYSTEM FOR INTERNAL COMBUSTION ENGINES
Filed Feb. 26, 1938  5 Sheets-Sheet 1
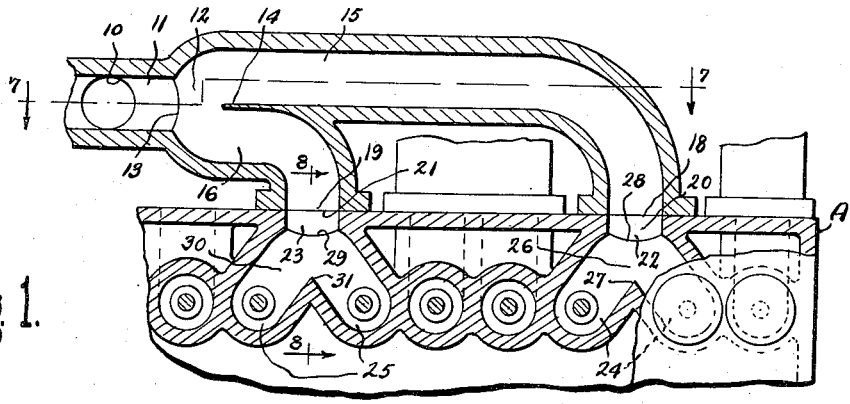
Fig. 1.
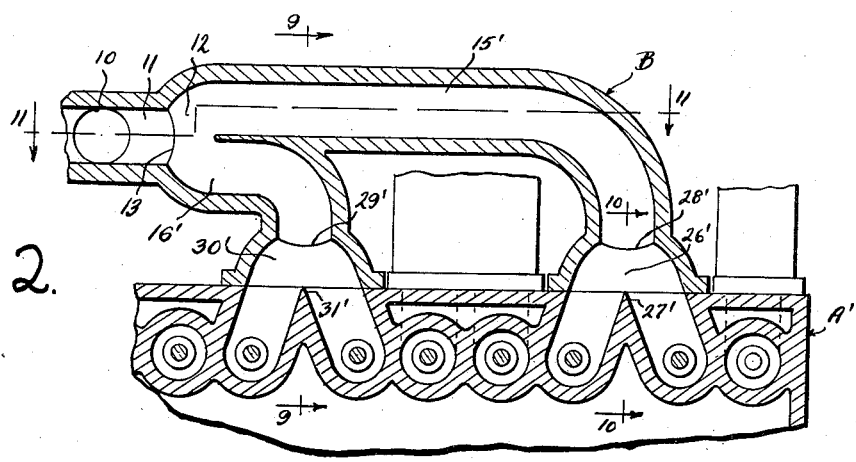
Fig. 2.
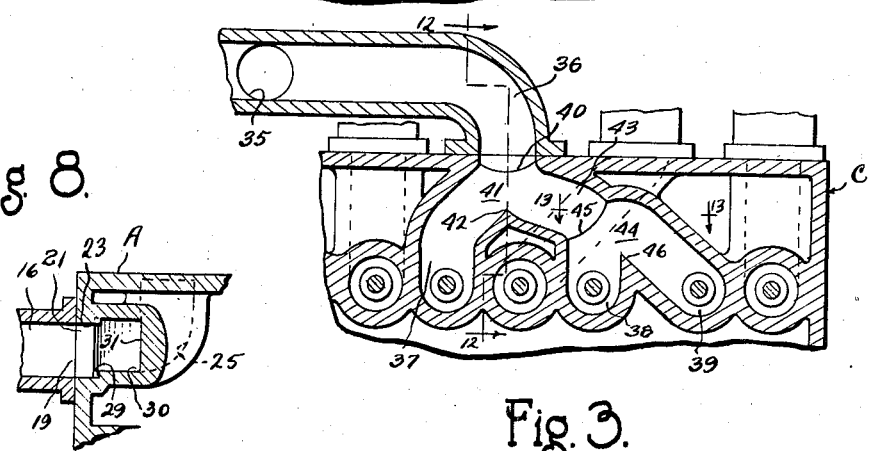
Fig. 8.
Fig. 3.
INVENTOR.
Enos R. Jacoby
BY
G. F. Hauke.
ATTORNEY.

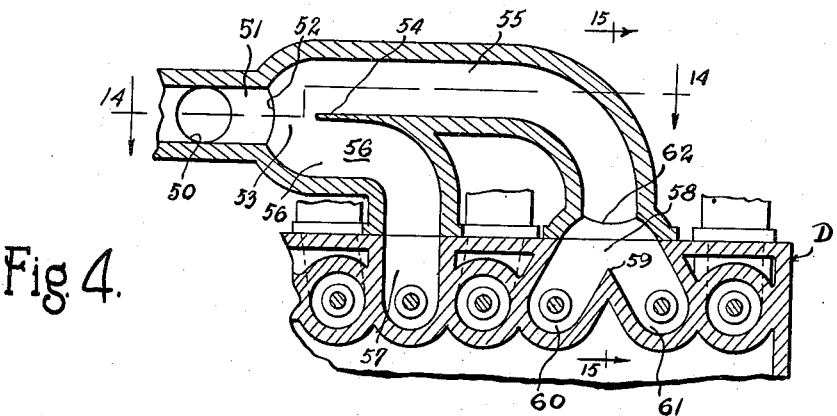
Fig. 4.
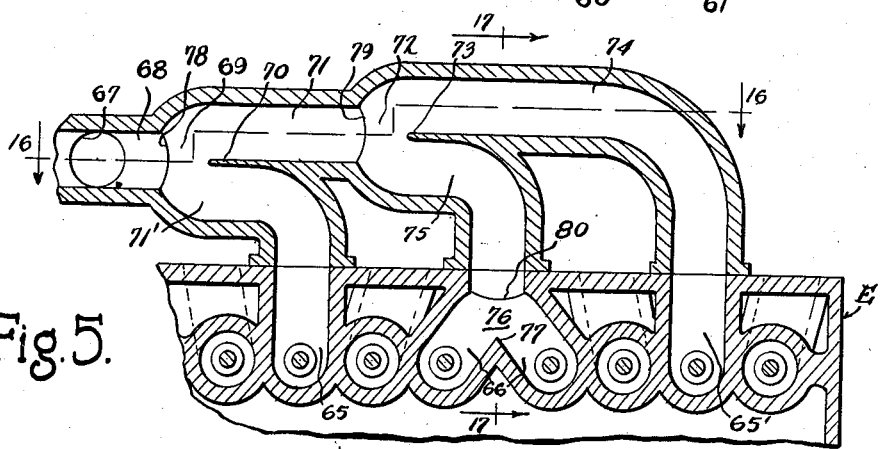
Fig. 5.
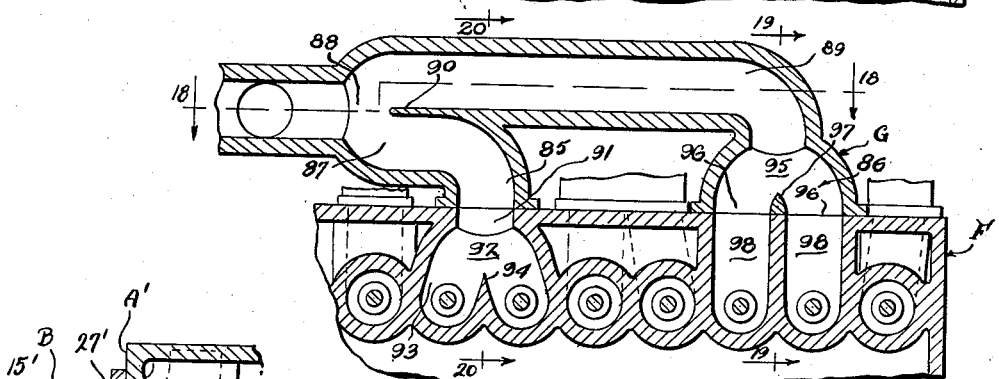
Fig. 10.    Fig. 6.
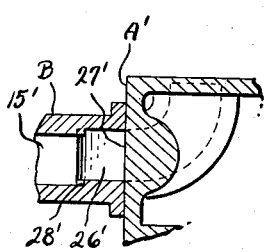
INVENTOR.
Enos R. Jacoby
BY
ATTORNEY.

June 20, 1939.  E. R. JACOBY  2,163,040
INDUCTION SYSTEM FOR INTERNAL COMBUSTION ENGINES
Filed Feb. 26, 1938  5 Sheets-Sheet 3
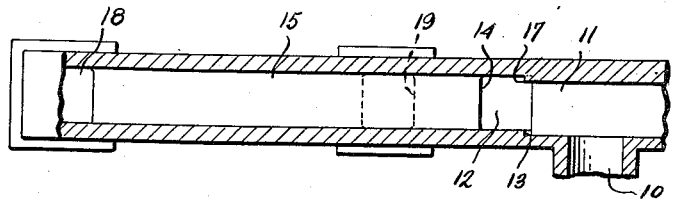
Fig. 7.
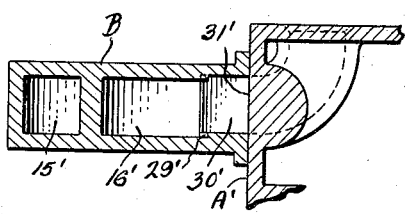
Fig. 9.  Fig. 11.
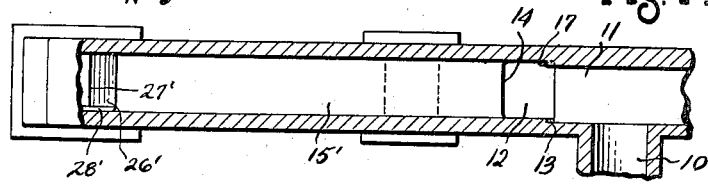
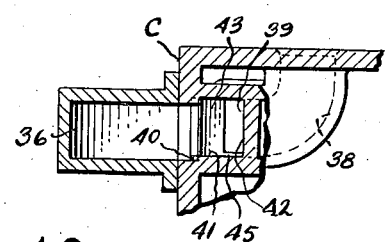
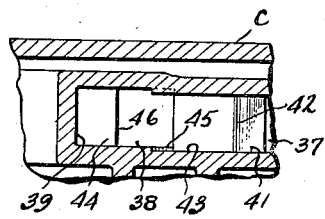
Fig. 12.  Fig. 13.
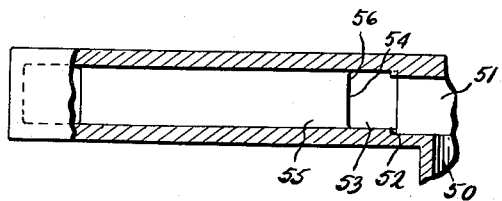
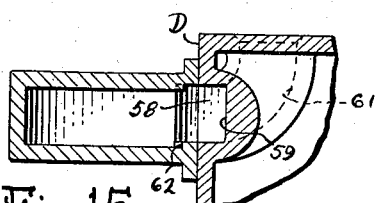
Fig. 14.  Fig. 15.
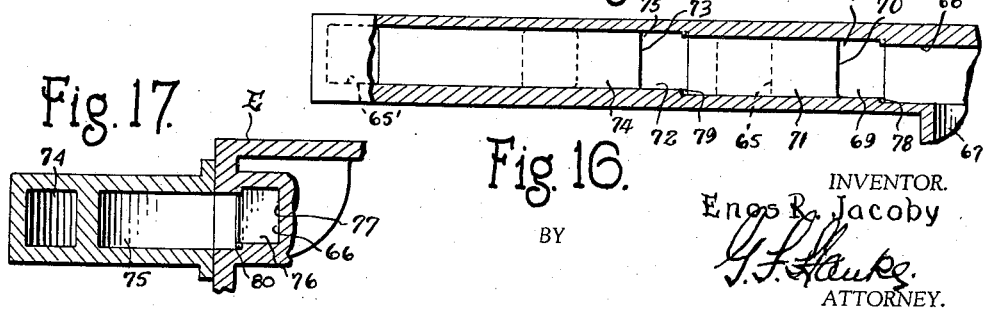
Fig. 17.  Fig. 16.
INVENTOR.
Enos R. Jacoby
BY
ATTORNEY.

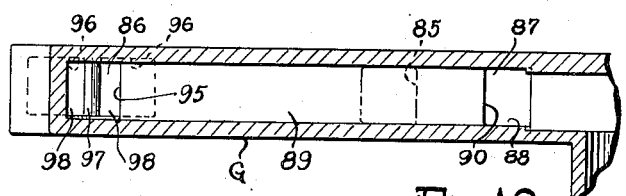
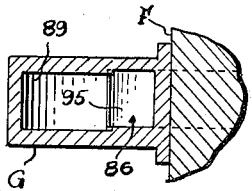
Fig. 18.  Fig. 19.
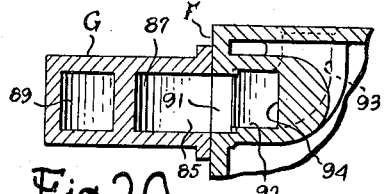
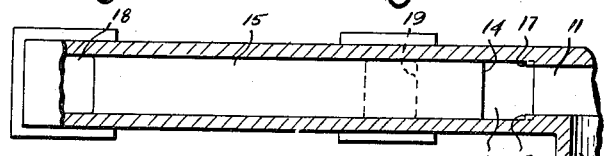
Fig. 20.  Fig. 21.
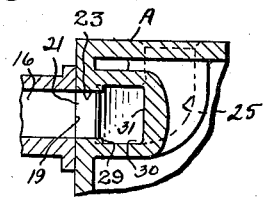
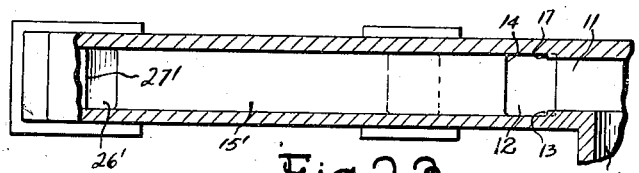
Fig. 22.  Fig. 23.
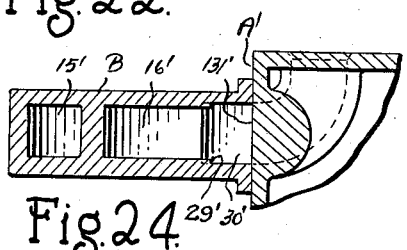
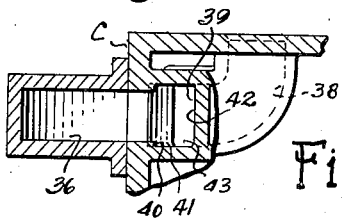
Fig. 24.  Fig. 25.
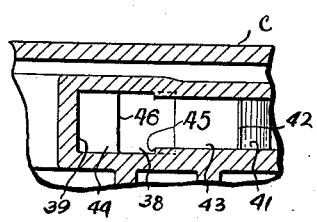
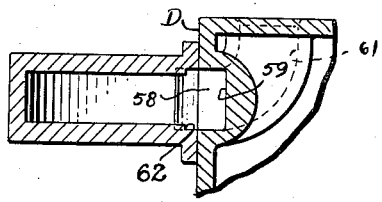
Fig. 26.  Fig. 27.
INVENTOR.
Enos R. Jacoby
BY
ATTORNEY.

June 20, 1939.  E. R. JACOBY  2,163,040

INDUCTION SYSTEM FOR INTERNAL COMBUSTION ENGINES

Filed Feb. 26, 1938  5 Sheets-Sheet 5

INVENTOR.
Enos R. Jacoby
BY
ATTORNEY.

Patented June 20, 1939

2,163,040

UNITED STATES PATENT OFFICE 2,163,040

INDUCTION SYSTEM FOR INTERNAL COMBUSTION ENGINES

Enos R. Jacoby, Muskegon, Mich., assignor to Continental Motors Corporation, Detroit, Mich., a corporation of Virginia Application February 26, 1938, Serial No. 192,722

10 Claims. (Cl. 123—52)

This invention relates to an induction system for a multi-cylinder internal combustion engine and more particularly to the means for controlling fluid flow through said induction system in order to provide for a substantially uniform distribution of said fluid flow to the various engine cylinders.

The constructions as herein illustrated provide for control of fluid flow by means of various instrumentalities which are in part, if not all located within the cylinder block, and it is more particularly adapted for engines commonly referred to as those having individual intake ports and such induction systems are sometimes referred to as induction systems of the individual port type.

Figure 28:
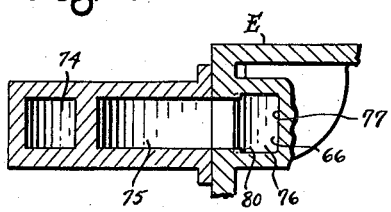
Figure 29:
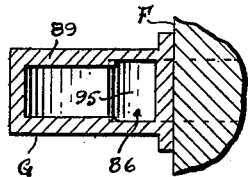
Figure 30:
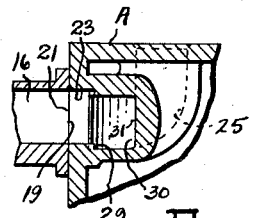
Figure 31:
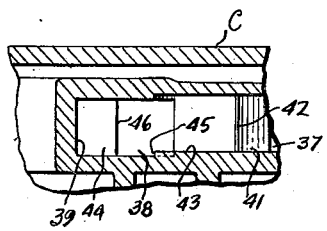

For a more detailed understanding of this invention reference may be had to the accompanying drawings illustrating preferred embodiments of the invention and in which:

Fig. 1 is a fragmentary plan sectional view of an induction system constructed in accordance with the invention, Fig. 2 is a plan sectional view of an induction system of a modified form of construction, Fig. 3 is another fragmentary plan sectional view of another form of construction, Fig. 4 is a plan sectional view of a still further modified construction, Fig. 5 is a fragmentary plan sectional view of still another modified form of construction, Fig. 6 is a fragmentary plan sectional view of a further modified form of construction, Figs. 7 and 8 are detail sectional views taken on the lines 7—7 and 8—8 of Fig. 1, Figs. 9, 10 and 11 are detail sectional views taken on the lines 9—9, 10—10 and 11—11 of Fig. 2, Figs. 12 and 13 are detail sectional views taken on the lines 12—12 and 13—13 of Fig. 3, Figs. 14 and 15 are sectional views taken on the lines 14—14 and 15—15 of Fig. 4, Figs. 16 and 17 are detail sectional views taken on the lines 16—16 and 17—17 of Fig. 5, Figs. 18, 19 and 20 are detail sectional views taken on the lines 18—18, 19—19 and 20—20 of Fig. 6, Figs. 21 to 29 inclusive are detail sectional views similar to Figs. 7, 8, 11, 9, 12, 13, 15, 17 and 19 respectively, but illustrating the use of shoulders instead of dams for accomplishing the reatomization of wet fuel flowing through the induction system and for controlling the distribution of the fluid, Figs. 30 and 31 are detail sectional views similar to Figs. 8 and 13 respectively, but illustrating the use of a shoulder in the floor and dam in the roof of the induction system whereby to reatomize wet fuel and control the flow of fluid through said induction system.

Figure 32:
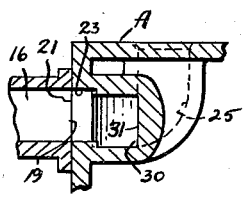
Figure 33:
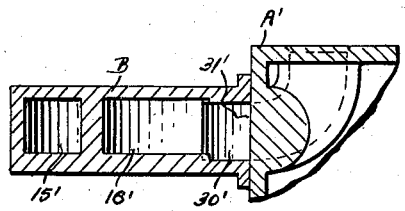
Figure 34:
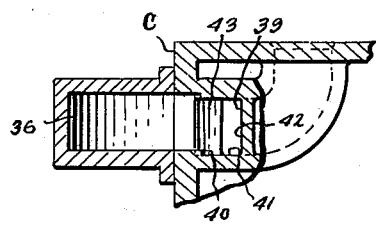
Figure 35:
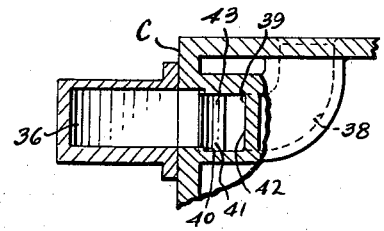

Figs. 32, 33 and 34 are detail sectional views similar to sectional views 8, 9 and 12, but show a modified construction embodying the construction of a shoulder in the floor and dams in the roof of the induction system, and Fig. 35 is a detail sectional view similar to Fig. 12 but illustrates the use of a shoulder in the floor and a dam in the roof of the induction system.

In all forms of the invention herein illustrated, it will be noted that the induction system includes a primary fluid conducting portion 10 which may be of the downdraft or updraft type and which connects with a primary lateral conducting portion 11 in Figs. 1 and 2. Said lateral conducting portion 11 if preferably a closed conduit and is substantially straight whereby to permit the fluid flowing therethrough to attain substantial equilibrium before being introduced into the primary distributing chamber 12. Intermediate said primary distributing chamber 12 and the conduit 11 is a dam 13 extending transversely across the floor of the induction system and constructed arcuate with the concave face thereof facing the split 14. The split 14 is preferably aligned with the axis of the conduit 11 and is spaced from said arcuate dam 13 and functions in cooperation with the dam to distribute the fluid flowing through said induction system into the secondary lateral conducting portions 15 and 16. Opposite to the dam 13 is a shoulder 17 extending transversely across the roof of the induction system and this shoulder is constructed arcuate with the convex face thereof facing the split 14. Both the dam 13 and the shoulder 17 function to re-atomize wet fuel flowing along the corresponding wall of the induction system since the fuel is picked off the edge thereof by the fuel mixture flowing past and carried along in the fuel mixture stream. The dam and shoulder both function satisfactorily to accomplish this result and both serve to control distribution of wet fuel which flows over the dam or shoulder and which is not re-atomized.

The operation and functioning of these dams and shoulders is more particularly defined in applicant's co-pending applications, Serial No. 47,152 filed October 28, 1935 and Serial No. 137,488 filed April 17, 1937, which is a continuation case of the first mentioned application.

Serial No. 137,488 has matured into Patent Number 2,137,802. It is therefore not believed necessary to describe in detail the operation and functioning of these arcuate dams and shoulders which cooperate with the associated split in conjunction with the distributing chamber and lateral conduction portions or conduits in obtaining this fluid distribution, since the present invention relates more particularly to the specific location and arrangement of such devices. The dams and shoulders illustrated herein are referred to as fluid flow impeding means and in the description and claims such terminology defines both a dam or shoulder and the scope of the claims should be so interpreted.

In Fig. 1, the secondary lateral conducting portions 15 and 16 terminate in outlets 18 and 19 respectively which are aligned with the intake openings 20 and 21 of the cylinder block, said cylinder block further including passages 22 and 23 respectively forming continuations of the lateral conducting portions 15 and 16. These secondary runner portions form closed conduits in which the fluid flow may attain equilibrium prior to being discharged therefrom. The cylinder block A includes intake passages 24 and 25 respectively associated with the secondary conducting portions 15 and 16. Intermediate the cylinder block passages 24 and conduit 15—22 is a distributing chamber 26, the passages being separated by a split 27 which split is spaced from the fuel flow impeding means 28 located intermediate the distributing chamber and conduit portion 22. In the construction illustrated by Fig. 1, the fuel flow impeding means 28 is a dam and operates and functions in conjunction with the distributing chamber 26 and split 27 in a manner similar to the functioning and operation of the fuel flow impeding means 13. Likewise the secondary conduit or runner portion 16—23 terminates in a fuel flow impeding means 29 for acting on the fuel flowing into the distributing chamber 30 and cooperates with the split 31 to distribute the fluid flowing through said induction system into the cylinder passages 25.

The construction illustrating Fig. 2 differs from that illustrated in Fig. 1 by reason of the fact that the splits 27' and 31' extend to a point substantially flush with the side face of the cylinder block A'. The distributing chambers 26' and 30' are here carried without the cylinder block near the termination of the manifold section B. Likewise the fuel impeding means 28' and 29' are not here located with the cylinder block but are located very closely adjacent thereto. The secondary lateral conducting portions 15' and 16' are similar of course to the portions 15 and 16 of Fig. 1 and it is particularly noted that the functioning of both constructions illustrated in Figs. 1 and 2 is practically the same.

In Fig. 3 the primary conducting portion 35 connects with the primary lateral conduit 36 and in this case the engine block C is provided with three intake passages 37, 38 and 39. The conduit 36 terminates in a fuel impeding means 40 within the cylinder block and the fluid flowing through said conduit 36 is introduced into a distributing chamber 41 within the cylinder block, said fluid being acted upon by the split 42 to divide the fluid flow into proper proportions for flow into the passage 37 and passage 43. The latter passage 43 terminates in a second distributing chamber 44 after flowing over the impeding means 45 and the fluid is acted upon by split 46 to divide the flow thereof into passages 38 and 39.

In Fig. 4 the combustible fluid supplied to the engine is first introduced into the induction system through the primary conducting portion 50 to conduit 51 over the impeding means 52 and into the primary distributing chamber 53. Split 54 acts upon the fluid to divide same in the proper proportions to flow into the secondary conduits 55 and 56. In this construction the conduit 56 is connected with a single cylinder passage 57 in the cylinder block D whereas the conduit 55 terminates in a distributing chamber 58 and the fluid flowing into said distributing chamber is divided by split 59 to flow in cylinder passages 60 and 61. A fuel flow impeding means 62 is located intermediate the distributing chamber 58 and secondary lateral conducting portion 55 of the fuel induction system. It will be noted that in this construction the first distributing chamber and associated split and fuel impeding means is located without the cylinder block while the second distributing chamber 58 is located part within the block and part within the manifold, but the fuel impeding means 62 is located within the manifold while the split 59 is located within the cylinder block.

Fig. 5 illustrates a modified construction particularly applicable to an eight cylinder in-line engine which includes a cylinder block E having individual passages 65 and 65' and the Siamese passages 66. The induction system includes a primary conducting portion 67, similar to the portion 10 of Figs. 1 and 2 which connects with the primary lateral conducting portion 68. The portion 68 connects with the first distributing chamber 69 and the split 70 divides the fluid to flow in the secondary conducting portions 71 and 72, the latter being connected with cylinder passage 65 while the former secondary conducting portion 71 connects with a second distributing chamber 72. The fluid flowing through the distributing chamber 72 is divided by means of a split 73 and caused to flow in the third series of lateral conducting portions respectively numbered 74 and 75. The portion 74 connects with the cylinder passage 65' while the latter conducting portion 75 is connected with a distributing chamber 76 within the cylinder block and the fluid flowing into said chamber 76 is acted upon by a split 77 and caused to divide so as to flow in the Siamese passage 66. A fuel flow impeding means 78 is associated with the first distributing chamber 69, a fuel flow impeding means 79 is associated with the second distributing chamber 72 while the fuel flow impeding means 80 is associated with the third distributing chamber 76. It will thus be seen that the principles of the present invention may be incorporated in a structure in which some of the distributing chambers with associated dams or shoulders and splits are located entirely within the cylinder block, while others may be located in the manifold portion.

In Fig. 6 it will be noted that the present invention is embodied in an eight cylinder in-line engine including a cylinder F and in this modified construction the manifold G is branched to provide a pair of outlet portions 85 and 86. The outlet portion 85 is associated with a secondary conducting portion 87 leading off from the distributing chamber 88 while the outlet portion 86 is connected with a secondary lateral portion 89 also leading off from said distributing chamber 88, a split 90 being associated with the distributing chamber 88 to divide the fluid flow in the usual manner. In this construction the conducting portion 87 connects with a cylinder passage 91 which, in turn, is connected with a distributing chamber 92 from which lead off the cylinder passages 93 divided by a split 94. The chamber 92 and passages 93 as well as the split 94 are all contained within the cylinder block. The conducting portion 89 terminates in a distributing chamber 95 contained within the manifold portion and lying without the cylinder block and this distributing chamber is connected with a pair of manifold outlets 96 divided by a split 97, each outlet 96 being connected with a cylinder passage 98. It will here be noted that the chamber 95 and split 97 are contained within the manifold portion of the induction system.

It will be noticed that in Figs. 7 to 20 inclusive that the fuel impeding means embodied in the constructions shown comprise a dam extending transversely across the floor of the induction system and a shoulder extending transversely across the roof of the induction system. In Figs. 21 to 29 inclusive, it will be noted that the fuel impeding means here comprise shoulders extending transversely across both the floor and roof of the induction system, while in Figs. 30 to 34 inclusive, the fuel impeding means comprises a dam extending transversely across the roof of the induction system and a shoulder extending transversely across the floor of the induction system. Fig. 35 is a modification of the detail section of Fig. 12 and also the fuel impeding means as comprising a dam extending transversely across the floor of the induction system with a corresponding shoulder extending across the roof of the induction system.

These dams and shoulders are all constructed arcuate with the convex face thereof facing the associated split. It will be observed that various arrangements of passages may be provided for conducting the wet fuel into the engine cylinders. I prefer to define these passages as an induction system and it will be quite evident that the induction system comprises those passages leading from the primary conducting portion to the cylinder intake port and thus the specific arrangements herein illustrated and described are all illustrative of arrangements which will satisfactorily function. All of some of the distributing chambers may be carried within the cylinder block but the underlying principle of distribution as embodied in these structures is substantially the same.

It will be apparent to those skilled in the art to which this invention pertains that various modifications and changes may be made therein without departing from the spirit of this invention or from the scope of the appended claims.

I claim:

1. An induction system for a multi-cylinder engine having in combination, a cylinder block having a pair of cylinder intake passages each individually communicating with a cylinder intake port, said block having a partition separating said passages and providing a split, said induction system further including a distributing chamber located ahead of said split substantially within the cylinder block, and a secondary conducting portion ahead of said distributing chamber, said secondary conducting portion having a portion thereof adjacent to said distributing chamber constructed to provide a substantially straight closer conduit having a length sufficient to permit the fuel mixture flowing therethrough to attain substantial equilibrium prior to being inducted into said distributing chamber, and an arcuate fuel impeding means located substantially adjacent to the outlet of said conduit and acting on the fuel precipitate flowing into said distributing chamber to substantially reatomize the same and to selectively direct wet fuel in the cylinder intake passage open to engine suction pressure.

2. An induction system for a multi-cylinder engine having in combination, a cylinder block having a pair of cylinder intake passages each individually communicating with a cylinder intake port, said block having a partition separating said passages and providing a split extending to a point substantially flush with the side face of the cylinder block, said induction system further including a distributing chamber located within said cylinder block ahead of said split and a secondary conducting portion ahead of said distributing chamber, said secondary conducting portion having a portion thereof adjacent to said distributing chamber constructed to provide a substantially straight closed conduit having a length sufficient to permit the fuel mixture flowing therethrough to attain substantial equilibrium prior to being inducted into said distributing chamber, and an arcuate fuel impeding means located substantially adjacent to the outlet of said conduit and acting on the fuel precipitate flowing into said distributing chamber to substantially reatomize the same and to selectively direct wet fuel in the cylinder intake passage open to engine suction pressure.

3. An induction system for a multi-cylinder engine having in combination, a cylinder block having a pair of cylinder intake passages each individually communicating with a cylinder intake port, said block having a partition separating said passages and providing a split, said cylinder block further provided with a distributing chamber located ahead of said split and a secondary conducting portion ahead of said distributing chamber, said secondary conducting portion having a portion thereof adjacent to said distributing chamber constructed to provide a substantially straight closed conduit having a length sufficient to permit the fuel mixture flowing therethrough to attain substantial equilibrium prior to being inducted into said distributing chamber, and an arcuate fuel impeding means located substantially adjacent to the outlet of said conduit and acting on the fuel precipitate flowing into said distributing chamber to substantially reatomize the same and to selectively direct wet fuel in the cylinder intake passage open to engine suction pressure, said fuel impeding means, distributing chamber and cylinder intake passages all contained substantially within the cylinder block.

4. An induction system for a multi-cylinder engine having in combination, a cylinder block having a plurality of cylinder intake passages each individually communicating with a cylinder intake port, said block having a partition separating two of said passages and providing a split, said induction system including a primary conducting portion, a lateral conducting portion communicating therewith and forming a substantially straight closed conduit terminating into a distributing chamber, a fuel impeding means located at the junction of said lateral conducting portion and said distributing chamber and acting on the fuel being inducted into said distributing chamber, a pair of second lateral conducting portions connected with said distributing chamber and separated at their beginning by a split, at least one of said second lateral conducting portions forming a substantially straight closed conduit terminating into a second distributing chamber immediately ahead of said split and separating said two cylinder intake passages, and a second fuel impeding means located at the junction of said second lateral conducting portion and said second distributing chamber and acting on the fuel being inducted into said second distributing chamber, said second fuel impeding means and said second distributing chamber together with the split and cylinder intake passages associated therewith being contained within said cylinder block.

5. An induction system for a multi-cylinder engine having in combination, a cylinder block having a plurality of cylinder intake passages each individually communicating with a cylinder intake port, said block having a partition separating two of said passages and providing a split, said induction system including a primary conducting portion, a lateral conducting portion communicating therewith and forming a substantially straight closed conduit terminating into a distributing chamber, a fuel impeding means located at the junction of said lateral conducting portion and said distributing chamber and acting on the fuel being inducted into said distributing chamber, a pair of second lateral conducting portions connected with said distributing chamber and separated at their beginning by a split, at least one of said second lateral conducing portions forming a substantially straight closed conduit terminating into a second distributing chamber immediately ahead of said split and separating said two cylinder intake passages, and a second fuel impeding means located at the junction of said second lateral conducting portion and said second distributing chamber and acting on the fuel being inducted into said second distributing chamber, said second distributing chamber and the split and cylinder intake passages associated therewith being contained within said cylinder block, while said second fuel impeding means is located without the cylinder block.

6. An induction system for a multi-cylinder engine having in combination, a cylinder block having chambers and passages forming at least a part of said induction system, that portion of the induction system within the block including a first and second distributing chamber connected together by a substantially closed conduit, first and second fuel impeding means located within the block ahead of said first and second distributing chambers respectively, a split associated with said first distributing chamber and acting on the fluid exhausted therefrom to divide and distribute the fluid flow into said closed conduit and a cylinder intake passage, said conduit having a length intermediate said distributing chambers sufficient to permit the fluid flowing therethrough to attain substantial equilibrium, and a second split associated with said second distributing chamber and acting on the fluid exhausted therefrom to distribute same into second and third cylinder intake passages.

7. An induction system for a multi-cylinder engine having in combination, a cylinder block having chambers and passages forming at least a part of said induction system, that portion of the induction system within the block including a first and second distributing chamber connected together by a substantially closed conduit, first and second fuel impeding means located within the block ahead of said first and second distributing chambers respectively, a split associated with said first distributing chamber and acting on the fluid exhausted therefrom to divide and distribute the fluid flow into said closed conduit and a cylinder intake passage, said conduit having a length intermediate said distributing chambers sufficient to permit the fluid flowing therethrough to attain substantial equilibrium, and a second split associated with said second distributing chamber and acting on the fluid exhausted therefrom to distribute same into second and third cylinder intake passages, both said fuel impeding means extending transversely of the floor of said conducting portions.

8. An induction system for a multi-cylinder engine having in combination, a cylinder block having chambers and passages forming at least a part of said induction system, that portion of the induction system within the block including a first and second distributing chamber connected together by a substantially closed conduit, first and second fuel impeding means located within the block ahead of said first and second distributing chambers respectively, a split associated with said first distributing chamber and acting on the fluid exhausted therefrom to divide and distribute the fluid flow into said closed conduit and a cylinder intake passage, said conduit having a length intermediate said distributing chambers sufficient to permit the fluid flowing therethrough to attain substantial equilibrium, and a second split associated with said second distributing chamber and acting on the fluid exhausted therefrom to distribute same into second and third cylinder intake passages, both said fuel impeding means extending transversely of the floor and roof of said conducting portions.

9. An induction system for a multi-cylinder engine including a cylinder block and having in combination, a pair of cylinder intake passages each individually communicating with a cylinder intake port, a split intermediate said cylinder intake passages, a distributing chamber ahead of said split, a secondary conducting portion ahead of said distributing chamber and having a portion thereof immediately adjacent said distributing chamber constructed to provide a substantially straight closed conduit having a length sufficient to permit the fuel mixture flowing therethrough to attain substantial equilibrium prior to being inducted into said distributing chamber, and an arcuate fuel impeding means located within the cylinder block substantially adjacent to the outlet of said conduit and acting on the fuel precipitate flowing into said distributing chamber to substantially reatomize the same and to selectively direct wet fuel flow into the cylinder intake passage open to engine suction pressure, said impeding means comprising dams or shoulders or both.

10. An induction system for a multi-cylinder engine including a cylinder block and having in combination, a pair of cylinder intake passages each individually communicating with a cylinder intake port, a split intermediate said cylinder intake passages, a distributing chamber ahead of said split, a secondary conducting portion ahead of said distributing chamber and having a portion thereof immediately adjacent said distributing chamber constructed to provide a substantially straight closed conduit having a length sufficient to permit the fuel mixture flowing therethrough to attain substantial equilibrium prior to being inducted into said distributing chamber, and an arcuate fuel impeding means located substantially adjacent to the outlet of said conduit and acting on the fuel precipitate flowing into said distributing chamber to substantially reatomize the same and to selectively direct wet fuel flow into the cylinder intake passage open to engine suction pressure, said impeding means located within the cylinder block and having a concave contour facing the fluid flow.

ENOS R. JACOBY.